Figure 1:
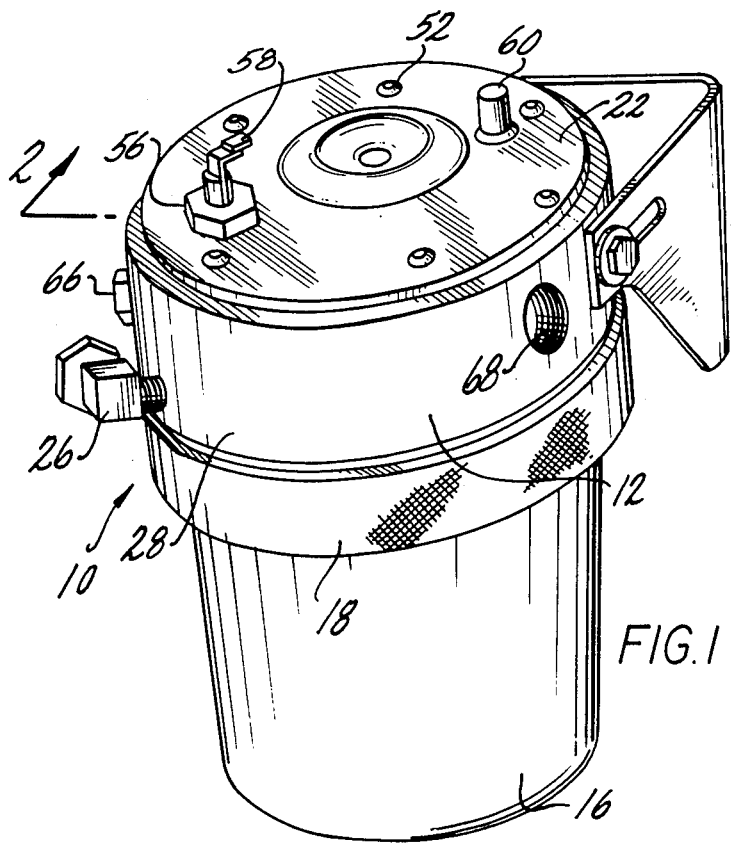

United States Patent [19]

Sims

[11] Patent Number: 4,717,474

[45] Date of Patent: Jan. 5, 1988

[54] OIL REFINER WITH ATOMIZING NOZZLE

[75] Inventor: Loyie H. Sims, Santa Ana, Calif.

[73] Assignees: David V. Sims; Michael J. Sims, both of Irvine, Calif. ; trustees for the David V. Sims and Michael J. Sims 1983 Revocable Estate Trust

[21] Appl. No.: 16,850

[22] Filed: Feb. 20, 1987

Related U.S. Application Data

[63] Continuation of Ser. No. 704,539, Feb. 22, 1985, abandoned, which is a continuation-in-part of Ser. No. 417,650, Sep. 13, 1982, abandoned, which is a continuation-in-part of Ser. No. 281,338, Jul. 8, 1981, Pat. No. 4,349,438.

[51] Int. Cl.⁴ .......................... B01D 35/18; B01D 3/28
[52] U.S. Cl. ..................................... 210/180; 210/184; 210/232; 210/443; 196/46.1; 196/128
[58] Field of Search ............... 210/168, 180, 184, 185, 210/186, 232, 238, 436, 443, 444; 196/46.1, 128

[56] References Cited

U.S. PATENT DOCUMENTS

| | | | |
|---|---|---|---|
| 2,460,888 | 2/1949 | Koinzan | 210/180 |
| 2,839,196 | 6/1958 | Schwalge | 210/180 |
| 3,241,677 | 3/1966 | Schmitz | 210/180 |
| 3,308,956 | 3/1967 | Yee | 210/232 |
| 3,756,412 | 9/1973 | Barrow | 210/180 |
| 4,146,475 | 3/1979 | Forsland | 210/180 |
| 4,189,351 | 2/1980 | Engel | 210/180 |
| 4,272,371 | 6/1981 | Moses | 210/180 |
| 4,289,583 | 9/1981 | Engel | 210/180 |
| 4,349,438 | 9/1982 | Sims | 210/180 |
| 4,390,425 | 6/1983 | Tafara | 210/232 |
| 4,443,334 | 4/1984 | Shugarman | 210/180 |

Primary Examiner—Ernest G. Therkorn
Attorney, Agent, or Firm—Charles H. Thomas

[57] ABSTRACT

A by-pass oil refining device for an internal combustion engine is equipped with an atomizing nozzle that constricts oil flow from a solid contaminant filtering element to a vaporization chamber where liquid contaminants are vaporized. The atomizing nozzle has a constricting orifice which is of a diameter sufficiently large to allow recirculation of oil to the vehicle engine, but which is small enough so that oil emanating from the filtering element and entering the vaporization chamber is atomized into a mist. Atomization of the oil significantly increases the extent to which liquid contaminants are vaporized and removed.

10 Claims, 9 Drawing Figures

U.S. Patent  Jan. 5, 1988  Sheet 1 of 2  4,717,474

OIL REFINER WITH ATOMIZING NOZZLE

BACKGROUND OF THE INVENTION

The present application is a continuation of application Ser. No. 704,539, filed Feb. 22, 1985, now abondoned, which is a continuation-in-part of U.S. application Ser. No. 417,650, filed on Sept. 13, 1982, now abondoned which is a continuation-in-part of U.S. application Ser. No. 281,338, filed on July 8, 1981, now U.S. Pat. No. 4,349,438, issued Sept. 14, 1982.

FIELD OF THE INVENTION

The present invention relates to by-pass oil refining devices for internal combustion engines. By-pass oil refining devices are coupled to the crankcases of internal combustion engines in an alternative path of lubricating oil flow in automotive vehicles and other machines employing internal combustion engines. Oil refiners percolate oil through a porous filter material and heat the oil to vaporize and remove volatile contaminants, such as water and fuel.

DESCRIPTION OF THE PRIOR ART

Contaminated lubricating oil used in internal combustion engines and other equipment is a principal cause of excessive wear and deterioration of engine parts and related equipment. At present, most internal combustion engines employ only a conventional mechanical filter for extracting materials such as dirt, carbon, soot, metal particles and other similar foreign material from lubricating oil. Liquid contaminants such as condensates, water and fuel, are often emulsified in the lubricating oil and cannot be separated by a conventional filter. It is therefore necessary for the lubricating oil of internal combustion engines using such mechanical filters to be changed at frequent intervals in order to minimize engine damage by contaminants entrained therein.

In recent years the increasing worldwide price of petroleum products has made it imperative for refining systems to be developed which will recondition lubricating oil so that it may be used and reused indefinitely. In this way only small amounts of additional lubricating oil are required by engine usage.

The problem of liquid contaminants has been recognized, and some efforts have been made to develop devices which use heat as a mechanism for separating oil and contaminants. Exemplary previous devices of this type include Schwalge, U.S. Pat. Nos. 2,635,759; 2,785,109 and 2,839,196; Barrow, U.S. Pat. No. 3,550,781; Priest, U.S. Pat. Nos. 3,616,885, 3,915,860 and 4,006,084; Forsland, U.S. Pat. No. 4,146,475, and my own prior U.S. Pat. No. 4,349,438.

Certain problems have existed which have heretofore prevented the widespread use of oil refiners in automotive vehicles. The principal problem with conventional oil refining devices is the inability of such devices to adequately remove liquid contaminants entrained in the oil. As a consequence, conventional oil refiners, by and large, are only slightly superior to the prior disposable filters which remove only solid contaminants. With conventional oil refining devices the engine lubricating oil may only be used for a slightly longer time than with conventional solid contaminant removing filters. The marginal improvement in oil recycling life that results from removing a small amount of the liquid contaminants cannot justify the incremental cost required to achieve this improvement.

SUMMARY OF THE INVENTION

The present invention provides a system for very significantly improving the extent to which liquid contaminants are removed from engine lubricating oil as the oil is recycled during engine use. As in conventional oil refiners, the oil refiner of the present invention also includes a filtering element for removing solid contaminants. Because the oil refiner of the invention removes liquid contaminants to a much greater extent than has heretofore been possible, engine oil may be used and reused for a far longer period of time than has heretofore been possible.

The oil refiner of the present invention is formed of a vaporization unit which defines an internal vaporization chamber having a decontaminated oil outlet therefrom. As in conventional oil refiners an electric heating element is disposed within the vaporization unit to heat the vaporization chamber. A disposable, detachable filter cartridge is releasably coupled to the vaporization unit and has a contaminated oil inlet and a decontaminated oil outlet. The decontaminated oil outlet is in direct communication with the filtered oil inlet to the vaporization unit.

Unlike prior, conventional oil refiners, filtered oil does not pass as a flowing liquid from the filtering element to the vaporization unit. To the contrary, an atomizing means is located between the filtered oil outlet of the filter cartridge and the filtered oil inlet to the vaporization chamber. The atomizing means in its simplest form is merely an orifice leading to the vaporization chamber and having a diameter sufficiently large to allow the passage of oil, but small enough so that the oil is atomized as it enters the vaporization chamber. Atomization is achieved by selecting the orifice size to create a significant pressure differential across the orifice. While orifices having a diameter of between about 0.010 inches and about 0.125 inches do produce some atomization at selected oil circulation rates, the preferred range of orifice diameters is between about 0.0135 inches and about 0.040 inches. Orifice diameters smaller than 0.0135 inches usually results in a flow rate which is insufficient to recycle the oil so as to remove contaminants that result from the operation of any internal combustion engine. If the orifice diameter is greater than about 0.040 inches, atomization will either not occur, or will occur to a degree too slight to produce any noticeable longevity of engine oil life.

There is a delicate balance is selecting proper orifice size because the orifice size controls both the extent of atomization and the flow rate of oil through the refiner simultaneously. Selection of orifice size also controls the pressure differential between the filtering element and the vaporization chamber. Consequently, in the preferred form of the invention the filtered oil inlet to the vaporization chamber is formed as a tapped bore in a wall or partition bounding the vaporization chamber. Different plug-like, annular structures which are externally threaded for mating engagement with the tapped bore can then be used interchangeably. An assortment of plugs having different orifice sizes or configurations may thereby be selected and used in an oil refiner, depending upon the internal combustion engine with which the refiner is to be employed.

To achieve a flow rate of 6 gallons of oil per hour an atomizing orifice size of between about 0.0135 inches and 0.030 inches is selected. For a single orifice, this will maintain a pressure differential between a pressure chamber and the vaporization chamber of about 40 psi. To achieve a flow rate of 12 gallons of oil per hour at the same pressure differential, an orifice size of between about 0.016 inches and 0.036 inches is selected. To achieve a flow rate of between 12 and 18 gallons per hour at a pressure differential of 60 psi, an orifice size of between about 0.020 inches and about 0.038 inches should be selected. To achieve a flow rate of between 18 and 24 gallons per hour at a pressure differential of 80 psi, the orifice size should be between about 0.024 inches and about 0.040 inches. The orifice size should be between about 0.024 inches and about 0.04 inches to achieve a flow rate of 24 gallons per hour at 100 psi.

To determine the proper orifice size, it should be considered that in general a change in orifice size of 0.002 inches diameter will change the volumetric flow rate between about 20% and 25% in the mid-range of most desired flow rates. Another factor which must be considered is the thickness of the partition in which the atomizing nozzle is located, as this will have a bearing on the length of the duct through which the oil must flow in order to pass from the filtering element to the vaporization chamber. The partition thickness separating the vaporization chamber from the incoming oil should be on the order of about 0.010 inches at a low pressure differential, such as 40 psi. The partition thickness may increase up to about 0.125 inches at higher pressures, such as 80 to 100 psi.

The orifice size at which oil in the oil refiner of the invention will atomize is a limiting factor insofar as achievable flow rate is concerned. As a consequence, it may be desirable to provide the vaporization unit with a plurality of atomizing nozzles, rather than a single nozzle, in order to achieve an adequate flow rate. A plurality of atomizing nozzles of smaller size can be substituted for a single atomizing nozzle having a larger orifice size. For example, at a given flow rate 3 atomizing nozzles having orifices of 0.013 inches diameter may be used to achieve about the same flow rate as a single atomizing nozzle having an orifice of 0.030 inches in diameter, at a constant pressure differential between the filtering element and the vaporization chamber.

Another modification of the invention involves the use of multiple orifices within a single plug that is threadably engaged in a tapped bore forming a filtered oil inlet to the vaporization chamber. While a plug having a single, central, axial duct can be used to form the simplest embodiment of an atomizing nozzle, alternative nozzles employing a plurality of ducts angled inwardly toward the center of the plug from the side of the plug remote from the vaporization chamber may also be employed.

In still other embodiments of the invention the atomizing nozzle may take the form of a cylindrical plug having radial slots defined in the externally threaded wall thereof. The longitudinal slots must, of course, be deeper than the thread pitch of the filtered oil inlet to the vaporization chamber in order to allow any oil at all to pass.

A wide variety of atomizing nozzle configurations and sizes may be employed within the scope of the invention. The essential feature of the invention, however, is that an atomizing nozzle is employed which constricts flow from a pressure chamber external to a vaporization chamber in order to build pressure in the pressure chamber. Pressure from the pressure chamber acts upon the oil to disperse oil flowing from the pressure chamber to the vaporization chamber into atomized droplets which are suspended as a mist within the vaporization chamber. Unlike conventional oil refiners, oil does not percolate as a liquid from an inlet into the vaporization chamber according to the present invention. To the contrary, it is sprayed as a mist into the vaporization chamber, thereby providing a much greater surface area so that entrained liquid contaminants are vaporized and removed from the oil to a far greater extent than has been possible with conventional oil refining systems.

The invention may be described with greater particularity by reference to the accompanying drawings.

DESCRIPTION OF THE DRAWINGS

FIG. 1 is a perspective view of a preferred embodiment of the oil refiner of the invention.

FIG. 2 is a sectional elevational view taken along the lines 2—2 of FIG. 1.

FIG. 3 is a top plan view of the oil refiner of FIG. 1.

FIG. 4 is a sectional elevational view of an atomizing nozzle used in the oil refiner of FIGS. 1–3.

FIG. 5 illustrates one alternative atomization arrangement according to the invention.

FIG. 6 is a sectional elevational view of an alternative atomizing nozzle according to the invention.

FIG. 7 is a top plan view of the atomizing nozzle of FIG. 6.

FIG. 8 illustrates another alternative atomizing arrangement according to the invention.

FIG. 9 is a top plan view taken along the lines 9—9 of FIG. 8.

DESCRIPTION OF THE EMBODIMENTS

FIG. 1 illustrates an oil decontaminating refiner 10 which has a vaporization unit 12 and a disposable, detachable filter cartridge 14, visible in FIG. 2, releasably coupled to the vaporization unit 12 by means of a cup-shaped outer container 16 and an annular cast aluminum retaining ring 18. As illustrated in FIG. 2, an arcuate electric heating element 20 is disposed upon the underside of a sheet metal cover 22 of the vaporization unit 12. The vaporization unit 12 also has a brass, machined contaminated oil inlet fitting 26 threadably engaged in a tapped, radial bore in a generally annular-shaped cast steel head assembly 28, as depicted in FIG. 1. The head assembly 28 has annular outer walls and a transverse partition, or deck 30 forming the lower boundary of the vaporization chamber 24 and defining a generally frusto-conical nozzle support 32 at its center. An axial, tapped bore 34 is defined at the center of the nozzle support 32, and receives an atomizing nozzle assembly 36. For ease of manufacture the atomizing nozzle assembly 36 is formed with a central, cylindrical annular plug 38 defining a central, coaxial duct 40 of controlled orifice size therethrough. A bushing 42 is threaded internally to receive the plug 38 in threaded engagement therewith, and is externally threaded and arranged in mating engagement with the tapped filtered oil inlet bore 34.

As illustrated in FIG. 2, a pressure chamber 44 is defined beneath the atomization assembly support 32 and above the filtered oil outlet 46 of the filter cartridge 14. A contaminated oil inlet 48 is located at the opposite end of the filter cartridge 14.

The atomizing assembly 36 constricts oil flow from the pressure chamber 44 to the vaporization chamber 24 and builds pressure in the pressure chamber 44 so as to atomize oil as suspended droplets as the oil enters the vaporization chamber 24. The orifice of the duct 40 is of a size big enough to allow an adequate oil flow rate into the vaporization chamber 24 and through the oil refiner 10, but is small enough so that oil does not percolate as a liquid through the filtered oil inlet 34 into the vaporization chamber 24, but rather is sprayed as an atomized mist into the vaporization chamber 24.

The atomizing assembly 36 atomizes the filtered oil into a fine, atomized spray, thereby greatly increasing the surface area of the oil so that liquid contaminants therein, such as water and fuel, are vaporized within the vaporization chamber 24 to a far greater extent than has been possible with any conventional oil refiner.

The cover 22 of the vaporization unit 12 is formed of a stamped, sheet metal member having an outer peripheral rim which encircles the upper edge of the refiner head 28. An annular cover plate gasket 50 forms an airtight seal between the cover 22 and the refiner head 28. The periphery of the cover 22 is secured to the refiner head 28 by means of six machine screws 52.

The cover 22 forms a convex protrusion 54 that extends into the vaporization chamber 24 within the vaporization unit 12 at a location within the vaporiation chamber 24 across from the filtered oil inlet 34 containing the atomization assembly 36. The convex protrusion 54 aids in laterally dispersing the atomized droplets of oil thoughout the vaporization chamber 24.

An elbow of the electric heating element 20 turns upwardly and passes through an opening in the cover 22. An airtight seal is maintained by suitable retainers and insulating seals, and the heater element 20 is attached to the cover assembly 22 by means of a retaining nut 56. A male, electrical connecting tab 58 is employed to receive a corresponding female electrical sleeve connector (not shown) from the electrical system powering the vehicle. A vent valve 60, of the type described in my prior U.S. Pat. No. 4,349,438, is also secured to the cover 22 to provide a vent to allow vaporized oil contaminants to be expelled from the oil refiner 10.

Figure 3:
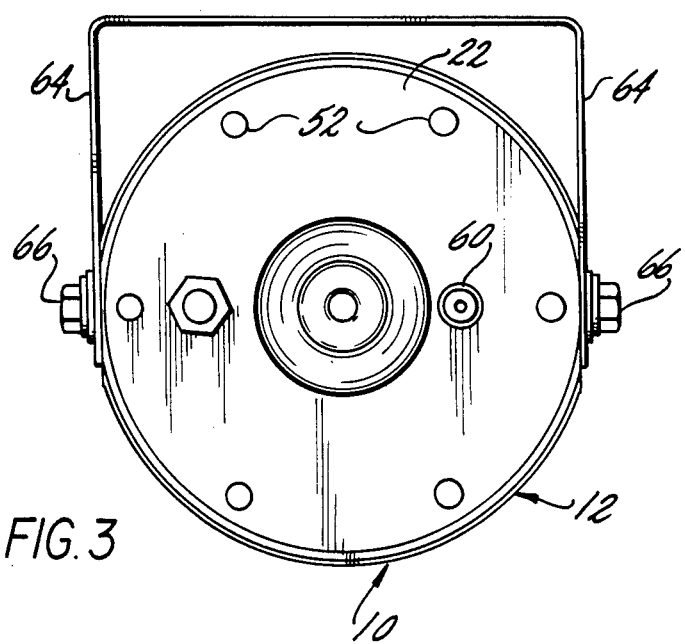

The oil refiner 10 also includes a mounting bracket 62 in the shape of a yoke, as best depicted in FIGS. 1 and 3. The yoke-shaped mounting bracket 62 has ears 64 which embrace the refiner head 28 and are secured thereto by means of releasable fastening bolts 66. The shanks of the bolts 66 pass through elongated slots 68 in the ears 64 to allow the oil refiner 10 to be appropriately positioned and oriented within the engine compartments of widely varying models of automotive vehicles. The oil refiner 10 can be positioned at virtually any orientation desired, since the oil in the vaporization chamber 24 need not flow as a liquid across any particular surface, but rather is transformed to atomized form by the electrical heating element 20. Ultimately, the oil passes out of the oil refiner 10 through a tapped radial bore 68 in the refiner head 28.

Figure 2:
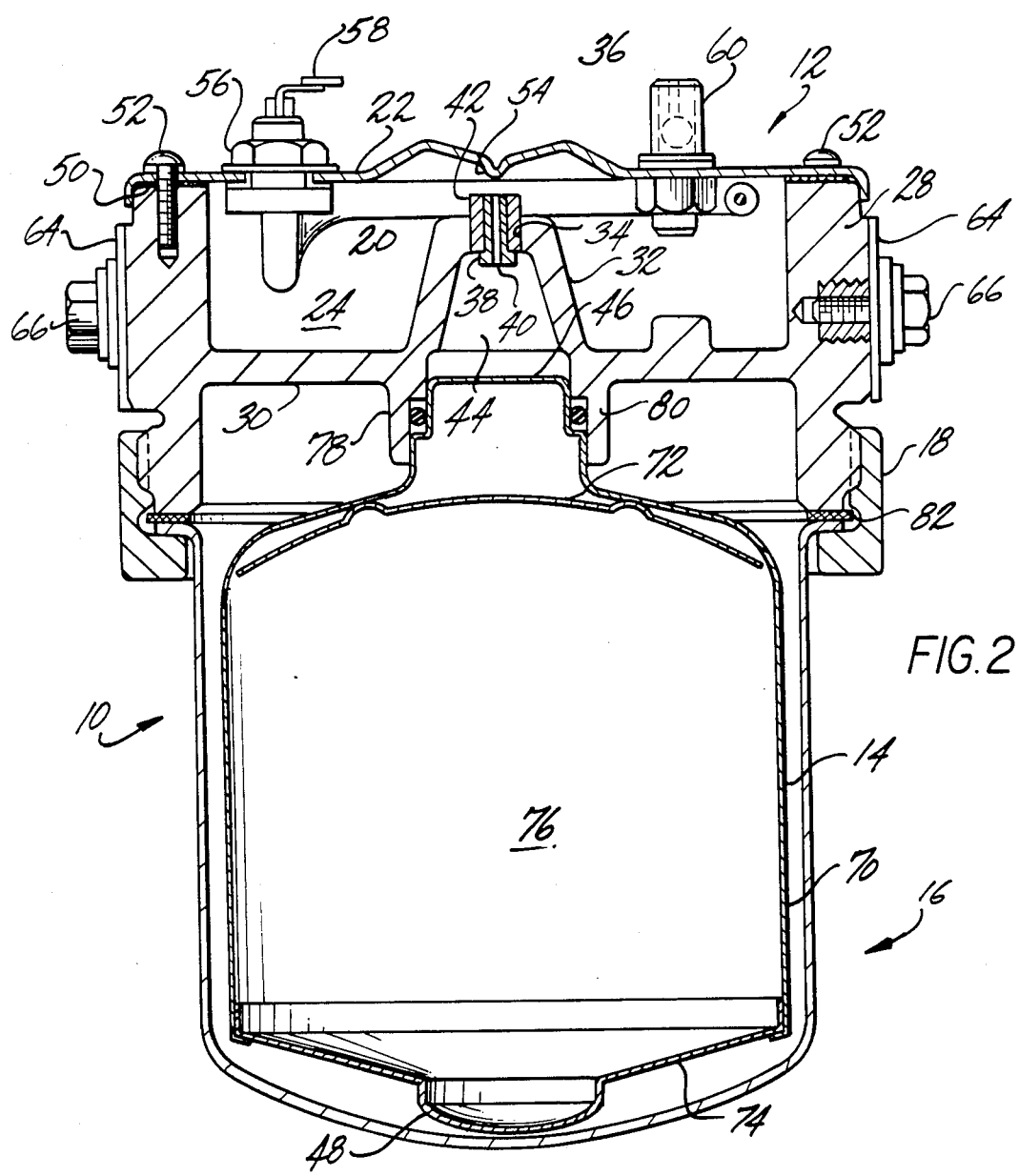

The filter cartridge 14 is a disposable, replaceable structure formed of a drawn, aluminum housing 70 necked down at its upper extremity to define the filtered oil outlet 46. Screens 72 and 74 at opposite ends of the housing 70 confine a porous filtering material 76 within the housing 70. The filter matrial 76 may be formed of shredded waist cotton and excelsior. The screens 72 and 74 are stamped aluminum structures perforated by apertures so as to allow oil to flow freely therethrough. The lower edge of the housing 70 is turned over to entrap the periphery of the screen 74, as illstrated in FIG. 2.

The filter cartridge 14 will be replaced periodically as entrapped solid contaminants impede the flow of oil therethrough. The neck at the upper end of the filter cartridge 14 fits into an annular collar 78 defined on the underside of the partition 30. An O-ring 80 provides a seal between the neck of the housing 70 and the collar 78. The bottom of the cup-shaped container 16 bears against a downwardly depending, bulbous protrusion of the screen 74 to force the neck of the housing 70 of the filter cartridge 14 up into the collar 78 into sealing engagement therewith. The container 16 and the filter cartridge 14 are held in position by threaded engagement of the retaining ring 18 with external threads on the refiner head 28. A container sealing gasket 82 prevents oil from leaking from between the container 16 and the refiner head 28.

Figure 4:
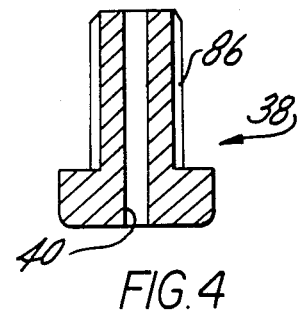

The atomizing nozzle plug 38 is depicted in section and in isolation in FIG. 4. In the embodiment depicted in FIG. 4 the atomizing structure 38 is of annular configuration and is threaded externally at 86 for engagement with the bushing 42 which is visible only in FIG. 2. As previously explained, the diameter of the constricting orifice of the single, central axial duct 40 is preferably between about 0.0135 and about 0.040 inches. A selection of an orifice diameter within this range will allow a satisfactory oil flow rate through the refiner 10 while ensuring a high degree of atomization of the oil emanating from the duct 40 to the vaporization chamber 24.

The duct 40 forms a constricting aperture or nozzle through which oil is forced upwardly from the pressure chamber 44 into the vaporization chamber 24. The oil emanates into the oil vaporization chamber 24 as an atomized mist. The convex protrusion 54 on the underside of the cover 22 aids in laterally dispersing the atomized droplets of oil throughout the vaporization chamber 24. The heating element 20 acts upon the large surface area of the atomized droplets of oil to vaporize liquid contaminants entrained therein. The boiling point of the oil is far above that of liquid contaminants which are found in the oil, so that the atomized droplets of oil eventually reform as a liquid and are discharged from the vaporization unit 12 through the decontaminated oil outlet 68 visible in FIG. 1.

Figure 5:
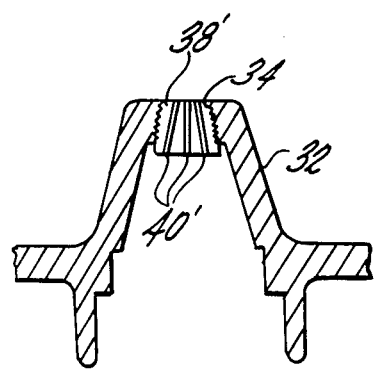

Due to the stringent limitations of suitable orifice size, it is sometimes desirable to provide a plurality of orifices 40' in a single atomizing plug 38', as depicted in FIG. 5. In this embodiment the plug 38' has a larger, outer diameter, and is threaded externally for direct engagement with the tapped bore 34 in the frusto-conical atomization assembly support 32. Each of the ducts 40' is oriented at an angle relative to the axis of the plug 38'. In this way a plurality of orifices formed by the ducts 40' may be provided in a single plug 38'. Since oil flow through the ducts 40' is cumulative, a greater oil flow rate through the refiner 10 can be achieved within the preferred limits of orifice diameter size.

Figure 7:
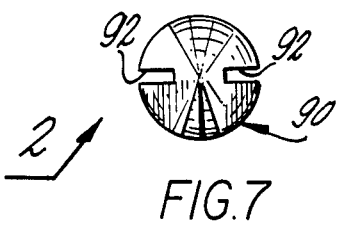
Figure 6:
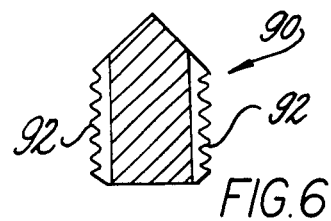

The orifice ducts are not necessarily parallel to the axis of the atomizing plug, as illustrated in FIG. 5. FIGS. 6 and 7 illustrate an alternative atomizing plug 90 which is of a generally cylindrical configuration but which has two diametrically opposite radial slots or channels 92 defined therein. Preferably, anywhere from two to six channel-like slots are provided in widths which preferably vary between about 0.0010 inches and 0.062 inches. The radial depth of the slots 92 preferably varies from between about 0.005 inches to about 0.030 inches in excess of the crests of the mating threads defined on the tapped bore 34. A plug configuration as depicted in FIGS. 6 and 7, with radial slots 92 defined therein as suggested will provide a structure which will atomize oil in an oil refiner 10 of the type depicted in FIGS. 1 through 3.

Figure 9:
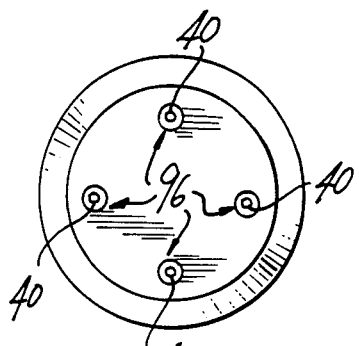
Figure 8:
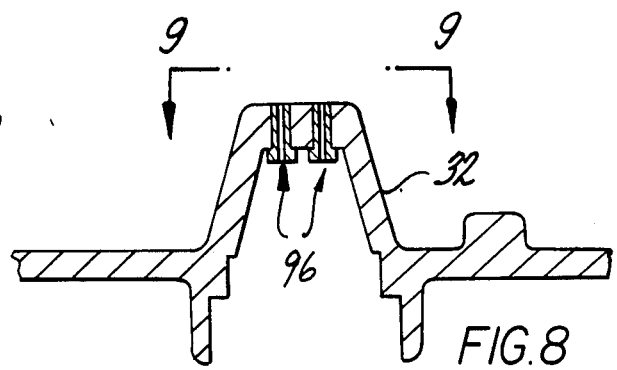

Still another alternative embodiment of the invention is illustrated in FIGS. 8 and 9. In the configuration illustrated in those drawing figures, a plurality of atomizing plugs 96 are provided in the frusto-conical atomizing assembly support 32. Specifically, four separate plugs 96, each having a single axial duct 40 therethrough are spaced at 90 degree intervals, each in a separate tapped bore in the atomizing assembly support 32. Preferably, the orifice diameter of each internal duct 40 is between about 0.0135 inches and about 0.040 inches. The flow rate of atomized oil through each plug 96 is cumulative, so that four times the flow rate can be achieved in the embodiment of FIGS. 8 and 9, as contrasted with a single plug having the same corresponding orifice diameter. As with the other embodiments of the invention, the atomizing nozzles formed by the plugs 96 constrict oil flow from the filter cartridge 14 to the vaporization chamber 24 to build pressure in the pressure chamber 44 to atomize liquid oil into suspended droplets as the oil enters the vaporization chamber 24 from the filter cartridge 14.

Undoubtedly numerous other variations and modifications of the invention will become apparent to those familiar with oil refining devices. Such variations and modifications are contemplated as being within the scope of the invention. The invention is an improvement in an automotive vehicle oil refining device having a filtering element and a vaporization element that defines a vaporization chamber. The improvement of the invention in such an oil refining device is an atomizing nozzle means for constricting oil flow from the filtering element to the vaporization chamber to build pressure to atomize liquid oil into suspended droplets as the oil enters the vaporizaton chamber from the filtering element. Accordingly, the scope of the invention should not be construed as limited to the specific embodiments thereof depicted and described herein, but rather is defined in the claims appended hereto.

I claim:

1. An oil decontaminating device sized and dimensioned to accomodate oil flow at a rate of six gallons per hour comprising a vaporization unit which defines an internal vaporization chamber and a decontaminated oil outlet therefrom and filtered oil inlet means including atomizing means for dispersing oil flowing into said vaporization chamber into atomized droplets which are suspended as a mist within said vaporization chamber, and said atomizing means defines an orifice with a diameter of between about 0.0135 inches and about 0.030 inches, electric heating means disposed within said vaporization unit to heat said vaporization chamber, a disposable detachable filter cartridge releasably coupled to said vaporization unit and having a contaminated oil inlet and a filtered oil outlet which is in communication with said filtered oil inlet means of said vaporization unit, thereby defining a pressure chamber therebetween, whereby said orifice of said atomizing unit constricts oil flow from said pressure chamber to said vaporization chamber with supply of pressure of about 40 pounds per square inch to said pressure chamber and atomizes oil as suspended droplets as said oil enters said vaporization chamber.

2. An oil decontaminating device sized and dimensioned to accommodate oil flow at a rate of twelve gallons per hour and comprising a vaporization unit which defines an internal vaporization chamber and a decontaminated oil outlet therefrom and filtered oil inlet means including atomizing means for dispersing oil flowing into said vaporization chamber into atomized droplets which are suspended as a mist within said vaporization chamber, and said atomizing means defines an orifice with a diameter of between about 0.016 inches and about 0.036 inches, electric heating means disposed within said vaporization unit to heat said vaporization chamber, disposable detachable filter cartridge releasably coupled to said vaporization unit and having a contaminated oil inlet and a filtered oil outlet which is in communication with said filtered oil inlet means of said vaporization unit, thereby defining a pressure chamber therebetween, whereby said orifice of said atomizing unit constricts oil flow from said pressure chamber to said vaporization chamber with supply of pressure of about 40 pounds per square inch to said pressure chamber and atomizes oil as suspended droplets as said oil enters said vaporization chamber.

3. An oil decontaminating device according to claim 2 wherein said vaporization unit includes a partition which separates said vaporization chamber from said pressure chamber, and said filtered oil inlet means is formed of at least one tapped bore through said partition, and said atomizing means is comprised of an externally threaded plug in said tapered bore, each plug defining at least one internal orifice as aforesaid.

4. An oil decontaminating device according to claim 3 wherein said partition is between about 0.010 inches and about 0.125 inches in thickness at each tapped bore.

5. An oil decontaminating device according to claim 3 further comprising a plurality of tapped bores.

6. An oil decontaminating device according to claim 3 further comprising a single tapped bore and a single plug which includes a plurality of orifices as aforesaid.

7. An oil decontaminating device sized and dimensioned to accomodate oil flow at a rate of between about twelve and eighteen gallons per hour and a vaporization unit which defines an internal comprising vaporization chamber and a decontaminated oil outlet therefrom and filtered oil inlet means including atomizing means for dispersing oil flowing into said vaporization chamber into atomized droplets which are suspended as a mist within said vaporization chamber, and said atomizing means defines an orifice with a diameter of between about 0.020 inches and about 0.038 inches, electric heating means disposed within said vaporization unit to heat said vaporization chamber, a disposable detachable filter cartridge releasably coupled to said vaporization unit and having a contaminated oil inlet and a filtered oil outlet which is in communication with said filtered oil inlet means of said vaporization unit, thereby defining a pressure chamber therebetween, whereby said orifice of said atomizing unit constricts oil flow from said pressure chamber to said vaporization chamber with supply of pressure of about sixty pounds per square inch to said pressure chamber and atomizes oil as suspended droplets as said oil enters said vaporization chamber.

8. An oil decontaminating device sized and dimensioned to accomodate oil flow at a rate of between about eighteen gallons per hour and about twenty four gallons per hour and comprising a vaporization unit which defines an internal vaporization chamber and a decontaminated oil outlet therefrom and filtered oil inlet means including atomizing means for dispersing oil flowing into said vaporization chamber into atomized droplets which are suspended as a mist within said vaporization chamber, and said atomizing means defines an orifice with a diameter of between about 0.024 inches and about 0.040 inches, electric heating means disposed within said vaporization unit to heat said vaporization chamber, a disposable detachable filter cartridge releasably coupled to said vaporization unit and having a contaminated oil inlet and a filtered oil outlet which is in communication with said filtered oil inlet means of said vaporization unit, thereby defining a pressure chamber therebeteween, whereby said orifice of said atomizing unit constricts oil flow from said pressure chamber to said vaporization chamber with supply of pressure of about eighty pounds per square inch to said pressure chamber and atomizes oil as suspended droplets as said oil enters said vaporization chamber.

9. An oil decontaminating device according to claim 8 in which said filtered oil inlet is defined as a tapped bore in said vaporization unit and said atomizing means is an annular structure threaded externally for engagement in said tapped bore relative to said vaporization element and having at least one interior orifice defined as aforesaid.

10. An oil decontminating device sized and dimensioned to accomodate oil flow at a rate of twenty four gallons per hour and comprising a vaporization unit which defines an internal vaporization chamber and a decontaminated oil outlet therefrom and filtered oil inlet means including atomizing means for dispersing oil flowing into said vaporization chamber into atomized droplets which are suspended as a mist within said vaporization chamber, and said atomizing means defines an orifice with a diameter of between about 0.024 inches and about 0.04 inches, electric heating means disposed within said vaporization unit to heat said vaporization chamber, a disposable detachable filter cartridge releasably coupled to said vaporization unit and having a contaminated oil inlet and a filtered oil outlet which is in communication with said filtered oil inlet means of said vaporization unit, thereby defining a pressure chamber therebetween, whereby said orifice of said atomizing unit constricts oil flow from said pressure chamber to said vaporization chamber with supply of pressure of about one hundred pounds per square inch to said pressure chamber and atomizes oil as suspended droplets as said oil enters said vaporization chamber.

* * * * *